US009840167B2

(12) United States Patent
Mixon et al.

(10) Patent No.: US 9,840,167 B2
(45) Date of Patent: Dec. 12, 2017

(54) POWER SEAT WITH COMPLETE WALK-IN SYSTEM (71) Applicant: AISIN TECHNICAL CENTER OF AMERICA, INC., Northville, MI (US)

(72) Inventors: Michael Mixon, Plymouth, MI (US); Ryosuke Mizuno, Novi, MI (US); Kamin Manatpon, Ann Arbor, MI (US)

(73) Assignee: AISIN TECHNICAL CENTER OF AMERICA, INC., Northville, MI (US)

( * ) Notice: Subject to any disclaimer, the term of this patent is extended or adjusted under 35 U.S.C. 154(b) by 157 days.

(21) Appl. No.: 14/788,166

(22) Filed: Jun. 30, 2015

(65) Prior Publication Data
US 2017/0001541 A1    Jan. 5, 2017

(51) Int. Cl.
*B60N 2/06* (2006.01)
*B60N 2/02* (2006.01)
*B60N 2/07* (2006.01)
*B60N 2/12* (2006.01)
*F16H 25/20* (2006.01)

(52) U.S. Cl.
CPC ............ *B60N 2/067* (2013.01); *B60N 2/0232* (2013.01); *B60N 2/0722* (2013.01); *B60N 2/12* (2013.01); *F16H 25/20* (2013.01); *F16H 2025/2084* (2013.01)

(58) Field of Classification Search
CPC . B60N 2/067; B60N 2/06; B60N 2/12; B60N 2/0232; B60N 2/0722
USPC ...................................................... 296/65.15
See application file for complete search history.

(56) References Cited

U.S. PATENT DOCUMENTS

| 5,516,071 A | 5/1996 | Miyauchi |
| 5,799,920 A | 9/1998 | Wittkowsky et al. |
| 7,303,223 B2 * | 12/2007 | Nakamura ........... B60N 2/0232 248/429 |
| 7,340,974 B2 * | 3/2008 | Landskron ............ B60N 2/067 248/424 |
| 7,407,214 B2 * | 8/2008 | Long ..................... B60N 2/067 248/429 |

(Continued)

FOREIGN PATENT DOCUMENTS

| DE | 10 2012 200 834 A1 | 7/2013 |
| DE | 10 2013 207 665 A1 | 7/2014 |

OTHER PUBLICATIONS

Extended European Search Report dated Nov. 16, 2016 in Patent Application No. 16177031.8.

*Primary Examiner* — H Gutman
(74) *Attorney, Agent, or Firm* — Oblon, McClelland, Maier & Neustadt, L.L.P.

(57) ABSTRACT

A walk-in apparatus for a seat of a vehicle, including an upper rail connected to the seat; a lower rail connected to a floor of the vehicle; a lead screw connected to the lower rail; a male helical gear connected to the lead screw, the male helical gear including external splines; and a female helical gear connected to the upper rail. The female helical gear includes internal splines configured to engage with the external splines of the male helical gear, and the male helical gear and the female helical gear are selectively separable. A torque transferred between the internal splines of the female helical gear and the external splines of the male helical gear when connected moves the upper rail relative to the lower rail.

8 Claims, 11 Drawing Sheets (56) References Cited

U.S. PATENT DOCUMENTS

| | | | | |
|---|---|---|---|---|
| 7,556,234 B2* | 7/2009 | Ito | ................ | B60N 2/067 248/424 |
| 8,226,063 B2* | 7/2012 | Weber | ................ | B60N 2/067 248/429 |
| 8,439,324 B2* | 5/2013 | Hake | ................ | B60N 2/0232 248/424 |
| 9,145,068 B2* | 9/2015 | Bosecker | ................ | B60N 2/067 |
| 9,499,073 B2* | 11/2016 | Tsuji | ................ | B60N 2/067 |
| 2004/0012236 A1* | 1/2004 | Mallard | ................ | B60N 2/0228 297/344.1 |
| 2006/0186687 A1* | 8/2006 | Kimura | ................ | B60N 2/0232 296/65.13 |
| 2006/0237987 A1* | 10/2006 | Nakamura et al. | ................ | B60N 2/0232 296/65.13 |
| 2006/0289717 A1* | 12/2006 | Ito | ................ | B60N 2/0232 248/419 |
| 2008/0047377 A1 | 2/2008 | Becker et al. | | |
| 2010/0219813 A1* | 9/2010 | Ito | ................ | B60N 2/0232 324/207.22 |
| 2010/0242650 A1* | 9/2010 | Koga et al. | ................ | B60N 2/0232 74/416 |
| 2013/0276562 A1* | 10/2013 | Sheridan | ................ | B60N 2/067 74/89.32 |
| 2015/0314710 A1* | 11/2015 | Mixon | ................ | B60N 2/2227 297/344.1 |
| 2015/0360587 A1* | 12/2015 | Hoffmann | ................ | B60N 2/0232 248/429 |
| 2017/0009870 A1* | 1/2017 | Hoffmann | ................ | B60N 2/02 |
| 2017/0174103 A1* | 6/2017 | Runde | ................ | B60N 2/067 |
| 2017/0197524 A1* | 7/2017 | Runde | ................ | B60N 2/067 |

* cited by examiner

POWER SEAT WITH COMPLETE WALK-IN SYSTEM

BACKGROUND

Field of the Disclosure

This application relates generally to improvements to a seat arrangement structure. More particularly the present disclosure relates to improvements seat slide device optimally applied for an automotive vehicle, and specifically related to a power seat sliding mechanism with a walk-in mechanism means for creating a space necessary for getting in and out the car.

Description of the Related Art

Vehicle seats are designed to offer comfort, and space to an occupant by allowing seat adjustments to a desired position. The adjustable vehicle seat allows an occupant to obtain a more comfortable seating position and to provide space behind, in front or on side of the vehicle seat to assist in entering and exiting the vehicle or storing objects.

Vehicle seats are typically mounted on a sliding device such as a sliding rail system. The seat sliding device and mounting are often a complex assembly, as it involves various components assembled in a particular order to enable seat movement in desired direction. One of the components of the seat arrangement device is a track arrangement fitted with a sliding arrangement to achieve the desired lateral and longitudinal movement of the seats. The lateral movement involves moving a seat towards a side of a vehicle or moving the seat towards the other seat followed by locking the seat in a desired position. Further, to lock the seat in a desired position a locking or latch mechanism is provided.

In the seat sliding device described in a published U.S. Pat. No. 5,516,071, the seat sliding device can be fully manually operated, for example using a handle under the seat or can be power assisted with a manual walk-in mechanism. A typical power operated seat includes a lead screw and nut arrangement installed within the tracks. The nut or the lead screw may be driven by a motor which results in a slow relative movement between the lead screw and the nut which is translated into seat movement. Further, a rotating type of lock is employed to lock the seat in desired position. Typically, a power operated sliding system is locked into place by the nut holder and lock lever teeth. Improving the lock strength of the teeth is desirable to improve safety. Traditional systems may also lack vertical looseness control which could prevent teeth bending and accidental unlocking. The rotational lock may also extend far below the lower rail which may cause packing constraints closer to the floor within the vehicle.

In the seat sliding device described in a published U.S. Pat. No. 7,303,223, the walk-in mechanism has a floating lead screw and fixed control nut. The nut is originally fixed to the lower rail while the lead screw is rotating through it allowing the upper structure to move forward and backward. Once this system is applied, the nut is fixed to the lower rail by lock lever. However, when the lock lever is released the nut is no longer constrained and therefore, the upper structure along with the nut is freely sliding forward resulting in a walk-in operation.

Thus, there is a need to resolve the above mentioned issues related to the walk-in mechanism. Additionally, there is a constant need to improve the seat sliding device and its performance.

SUMMARY

A walk-in apparatus for a seat of a vehicle, including an upper rail connected to the seat; a lower rail connected to a floor of the vehicle; a lead screw connected to the lower rail; a male helical gear connected to the lead screw, the male helical gear including external splines; and a female helical gear connected to the upper rail. The female helical gear includes internal splines configured to engage with the external splines of the male helical gear, and the male helical gear and the female helical gear are selectively separable. A torque transferred between the internal splines of the female helical gear and the external splines of the male helical gear when connected moves the upper rail relative to the lower rail. The forgoing general description of the illustrative implementations and the following detailed description thereof are merely exemplary aspects of the teachings of this disclosure, and are not restrictive.

DETAILED DESCRIPTION

In the drawings, like reference numerals designate identical or corresponding parts throughout the several views. Further, as used herein, the words "a", "an" and the like generally carry a meaning of "one or more", unless stated otherwise. The drawings are generally drawn to scale unless specified otherwise or illustrating schematic structures or flowcharts.

Furthermore, the terms "approximately," "proximate," "minor," and similar terms generally refer to ranges that include the identified value within a margin of 20%, 10% or preferably 5% in certain embodiments, and any values therebetween.

The terms "longitudinal", "lateral" and similar terms generally refer to the direction of movement with respect to the vehicle's front and side portion. The direction of movement along the front and rear is the longitudinal direction, while direction of movement towards and away from the side is the lateral direction.

Figure 1:
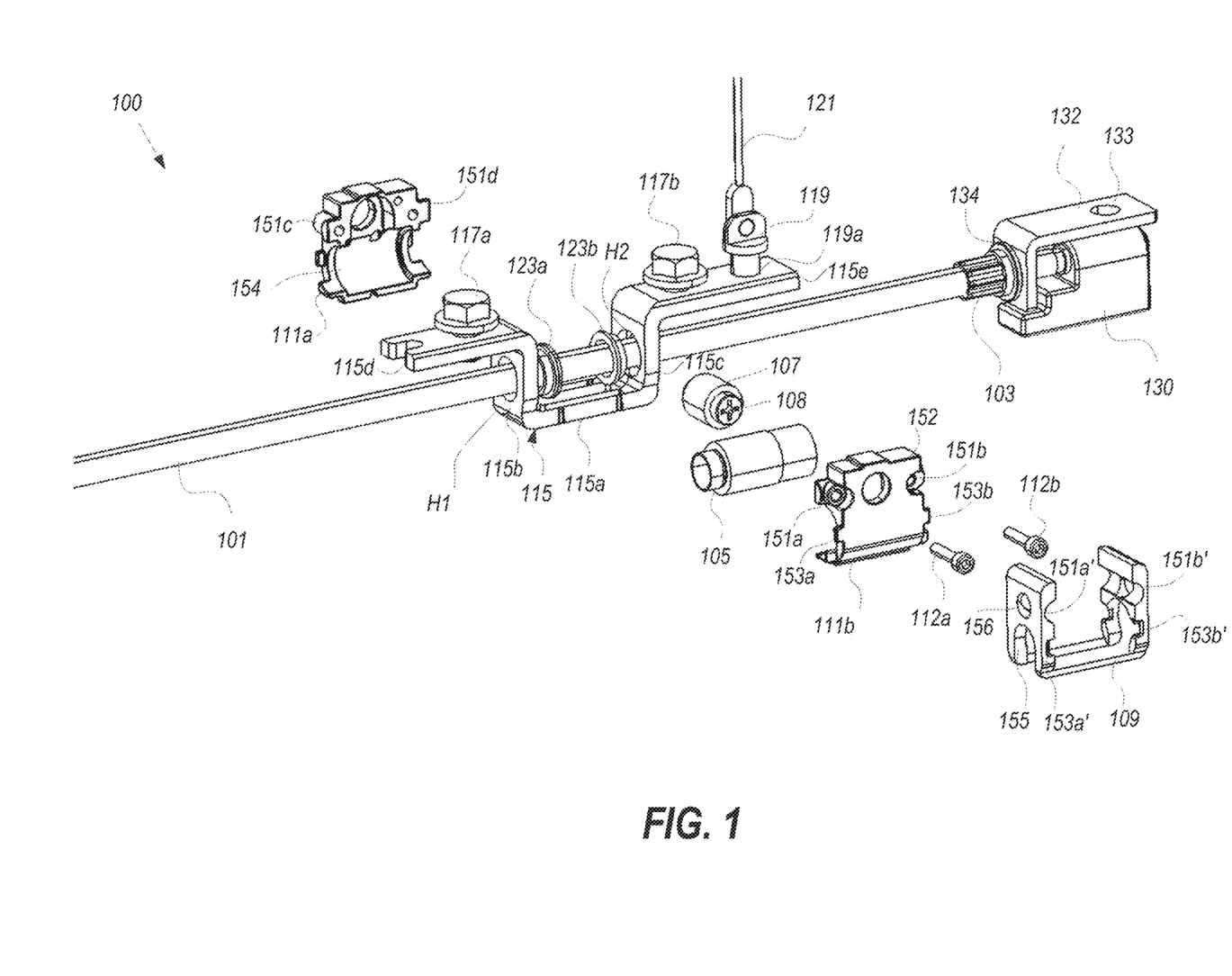
FIG. 1 is an exploded view of a walk-in mechanism of a power operated seat according to an aspect of present disclosure.

FIG. 1 is an exploded view of a walk-in mechanism 100 of a power seat apparatus according to an aspect of present disclosure. The walk-in mechanism 100 of a power seat apparatus includes a lead screw 101, a male helical gear 103, a female helical gear 105, a motor helical gear 107, a housing cover 109, housing members 111a and 111b, housing fasteners 112a and 112b, a hat bracket 115, rail fasteners 117a and 117b, a locking pin 119, a lock wire 121, and washer end supports 123a and 123b. These components when assembled together form the walk-in mechanism 100 which when operated allows quick and easy entry and exit. The walk-in mechanism 100 further includes a lead screw support 130, and a fixed bracket 132.

The lead screw 101 has helical threads (not shown) on the outer surface. One end of the lead screw 101 is supported by the lead screw support 130, which is fixed to the lower rail (not shown). The lead screw 101 is coaxially connected to the male helical gear 103 located close to the lead screw support 130. The male helical gear 103 is connected at one end by the fixed bracket 132.

The fixed bracket 132 is a significantly right-angled bracket with a lock hole 133 and a gear hole 134. The gear hole 134 connects the male helical gear 103 and the lock hole 133 is configured to hold the locking pin 119. The fixed bracket 132 is not fastened to the lead screw support 130.

The male helical gear 103 includes internal helical threads (not shown) and external splines. The helical threads of the lead screw 101 engage with the internal helical threads (not shown) of the male helical gear 103. The lead screw 101 and the male helical gear 103 are connected such that there is no relative linear motion between them. The male helical gear 103 is also coaxially connected to the female helical gear 105 via spline joint. The spline joint enables relative linear motion between the male helical gear 103 and the female helical gear 105, while restricting the relative rotational motion when engaged. The female helical gear 105 can be completely disconnected from the male helical gear 103 and the female helical gear 105 can move away from the lead screw support 130. Accordingly, the male helical gear 103 and the female helical gear 105 are selectively separable.

The female helical gear 105 includes internal splines 215 (shown in FIGS. 2A, 2B, and 2D) and external helical threads (not shown). The internal splines 215 enable connection with the male helical gear 103, while the external helical threads of female helical gear 105 enable connection with the motor helical gear 107. The female helical gear 105 has no contact with the lead screw 101, however they are mounted coaxially. The end supports 123a and 123b keeps the female helical gear 105 in a fixed position with respect to the hat bracket 115. The female helical gear 105 and the motor helical gear 107 are connected externally such that their rotational axes are perpendicular to each other.

The motor helical gear 107 includes external helical threads (not shown) and a hexagonal slot (not shown) located on the opposite side of a cross-shaped slot 108. The hexagonal slot (not shown) enables connection with a motor shaft (not shown). The motor helical gear 107 is motor driven and can rotate in either a clockwise or counter-clockwise direction. The motor helical gear 107 has a relative rotational motion with the female helical gear 105 and no relative linear motion. The motor helical gear 107 and the female helical gear 105 are enclosed inside a housing 300 (marked in FIG. 3). The housing 300 includes housing members 111a and 111b, housing fasteners 112a and 112h, and a housing cover 109.

The housing members 111a and 111b includes various slots and holes to enable a compact assembly and support for housing components. For example, a slot 154 corresponding to female helical gear 105 and a hole 152 corresponding to the motor helical gear 107 are provided in each of the housing members 111a and 111b. Further, a dimension of the slot 154 is large enough to allow free rotation of the female helical gear 105 within the assembled housing members 111a and 111b. The dimension of the hole 152 is large enough to allow free rotation of the motor helical gear 107 within the assembled housing members 111a and 111b. Holes 151a-151d are provided for fastening the housing members 111a and 111b. Furthermore, additional notches such as 153a and 153b may be provided along edges of the housing members 111a and 111b to hold the housing members 111a and 111b together or notches may be provided to connect to other components such as the housing cover 109. When the housing members 111a and 111b are fixed together using housing fasteners 112a and 112b, for example screws, bolts, or adhesives, they form a significantly rectangular box-like structure.

The housing cover 109 is significantly U-shape and surrounds the housing members 111a and 111b when assembled. Further the housing cover 109 is placed over the lead screw 101 and inside the hat bracket 115. The housing cover 109 also includes various slots and holes to enable a compact assembly and support for housing components. Additional notches and slots may also be provided corresponding to other connecting components. For example, a slot 151a'-151b' may be provided on the housing cover 109 corresponding to the peripheral projections of holes 151a-151d of the housing members 111a and 111b, slots 153a'-153b' may be provided on the housing cover 109 corresponding to the peripheral notches 153a-153b of the housing member 111b, a slot 155 may be provided corresponding to the lead screw 101.

The hat bracket 115 is a significantly U-shaped bracket with flanges having a plurality of holes. The hat bracket 115 can be divided into elements such as a base 115a, legs 115b and 115c, and flanges 115d and 115e. The length of the base 115a is relatively greater than length of the housing cover 109. Holes H1 and H2 are drilled in each leg 115b and 115c such that the holes have a common center axis. The diameter of the holes H1 and H2 in the leg 115b and 115c are greater than the outer diameter of the lead screw 101. Further, the center axis of the holes H1 and H2 are aligned with the rotation axis of the lead screw 101. The lead screw 101 passes through the holes in the legs 115b and 115c. The flanges 115d and 115e are connected to the upper rail (not shown) via fasteners 117a and 117b. The flange 115e, which is closer to the lead screw support 130, includes a hat lock hole 119a in which the locking pin 119 is inserted.

Figure 8:
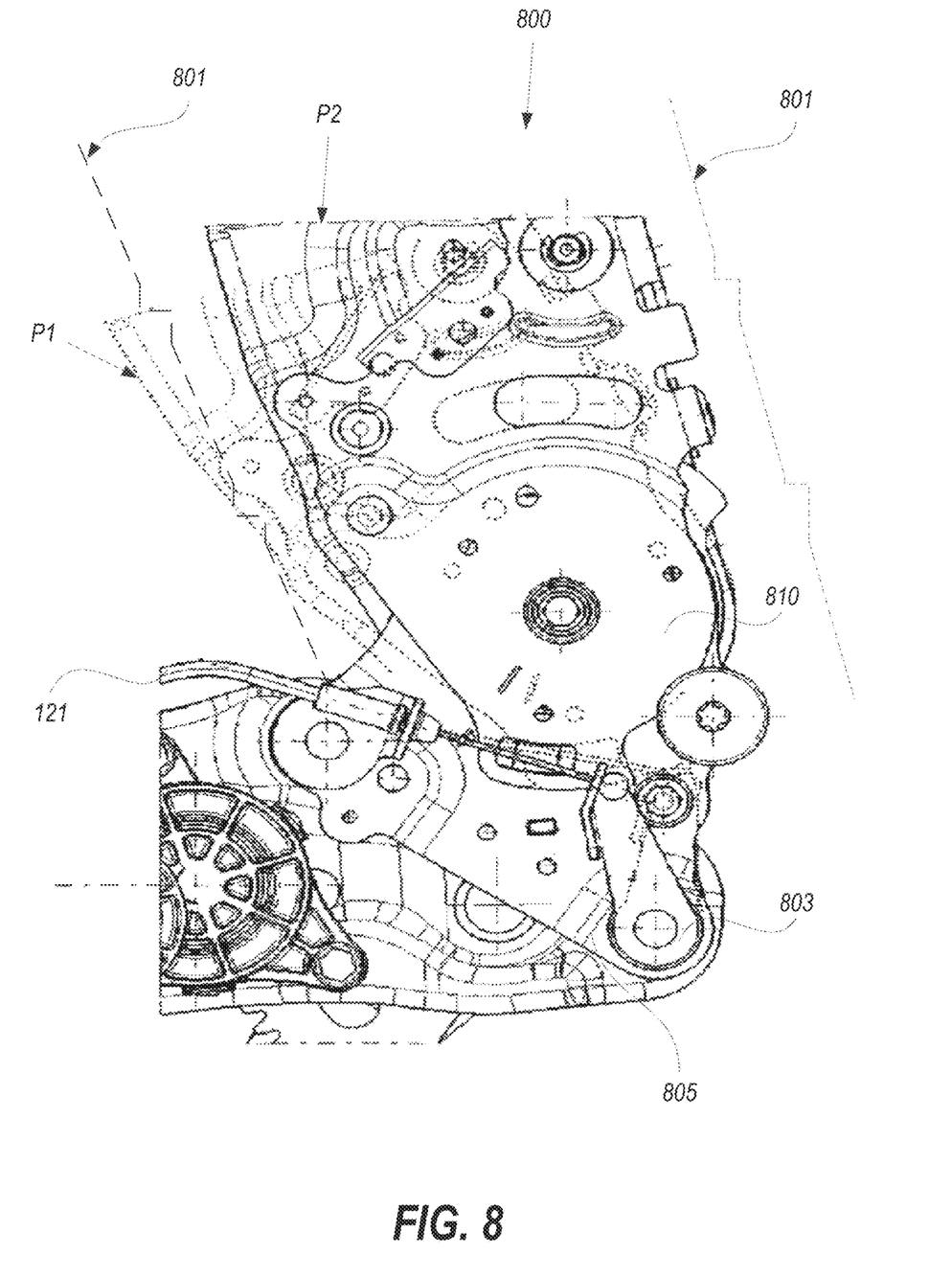
FIG. 8 illustrates a seat folding mechanism according to an aspect of present disclosure.

The locking pin 119 is a solid shaft. A first end of the locking pin 119 passes through the upper rail (not shown), the hat bracket 115, and the fixed bracket thus locking the three elements together. A second end of the locking pin 119 is connected. to the lock wire 121. The lock wire 121 pulls the locking pin 119 upwards and downward direction thus locking and unlocking, respectively, the fixed bracket 132. Referring to FIG. 8, the lock wire 121 is further connected to a seat folding mechanism 800 provided in a seat (not shown). The seat folding mechanism 800 includes a cable hinge 803, a recliner 805, cable 121 and a seat back recliner connection hinge 810. The cable wire 121 is connected to a cable hinge 803 which is further connected to recliner 805. The recliner 805 is connected to the seat back recliner connection 810. The recliner 805 and seat back recliner connection 810 provide a pivot point for the seat back 801 to occupy a forward position P1 and an upright position P2. In the forward position P1 the recliner 805 rotates and causes the cable hinge 803 to rotate backwards which pulls the cable wire 121 thus unlocking the locking pin 119 (shown in FIG. 6). In the upright position P2 the cable hinge 803 rotates forward causing the cable wire 121 to push the locking pin 119 (shown FIG. 4) in a locked position.

Figure 2A:
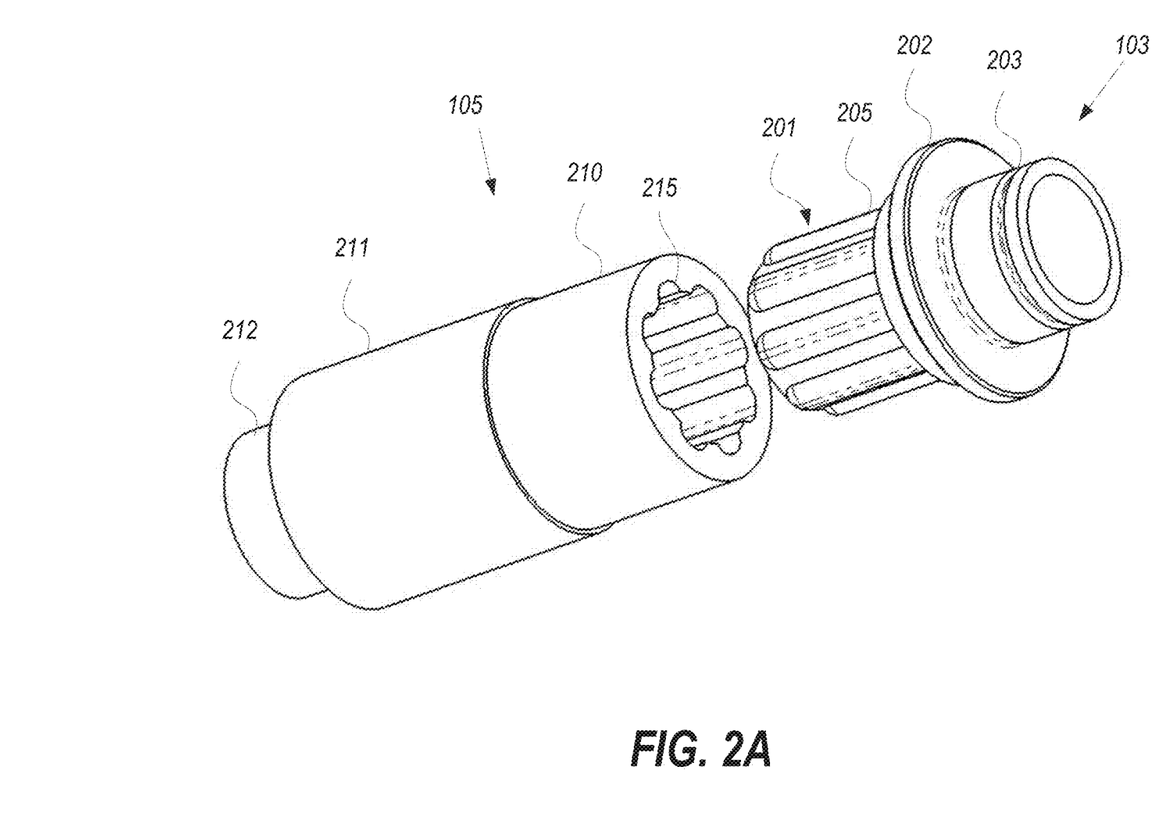
FIG. 2A an exploded view of a female helical gear and a male helical gear of the walk-in mechanism in FIG. 1 according to an aspect of present disclosure.

FIG. 2A illustrates a perspective view of the female helical gear 105 and the male helical gear 103. The male helical gear 103 is a step-like hollow shaft. A first step 201 of the male helical gear 103 includes external splines 205 along the circumference of the male helical gear 103. A second step 202 acts as an end support when connected to other components such as the fixed bracket 132 (in FIG. 1) from one side and female helical gear 105 on the other side. A third step 203 acts as a mounting support when mounted within the hole of the fixed bracket 132 (in FIG. 1). The third step 203 and the hole of the fixed bracket 132 are fixed together by a washer (not shown). Alternatively, other fastening means such as adhesive, snap-fit, compress fit, etc. may be provided to fix the male helical gear 103 to the fixed bracket 132.

The female helical gear 105 is a step-like hollow shaft. A first step 210 of the female helical gear 105 includes internal splines 215. The internal splines 215 engage with the external splines 205 of the male helical gear 103. A second step 211 of the female helical gear 105 includes an external helical gear (not shown). The edges of the second step 211 act as separators and end supports when the female helical gear 105 is connected to other components such as end supports 123a and 123b (in FIG. 1) and the male helical gear 103. A third step 212 is provided to mount the end support 123a and the outer diameter of the third step 212 is small enough to allow free rotation of the female helical gear 212 with respect to the end support 123a.

Figure 2B:
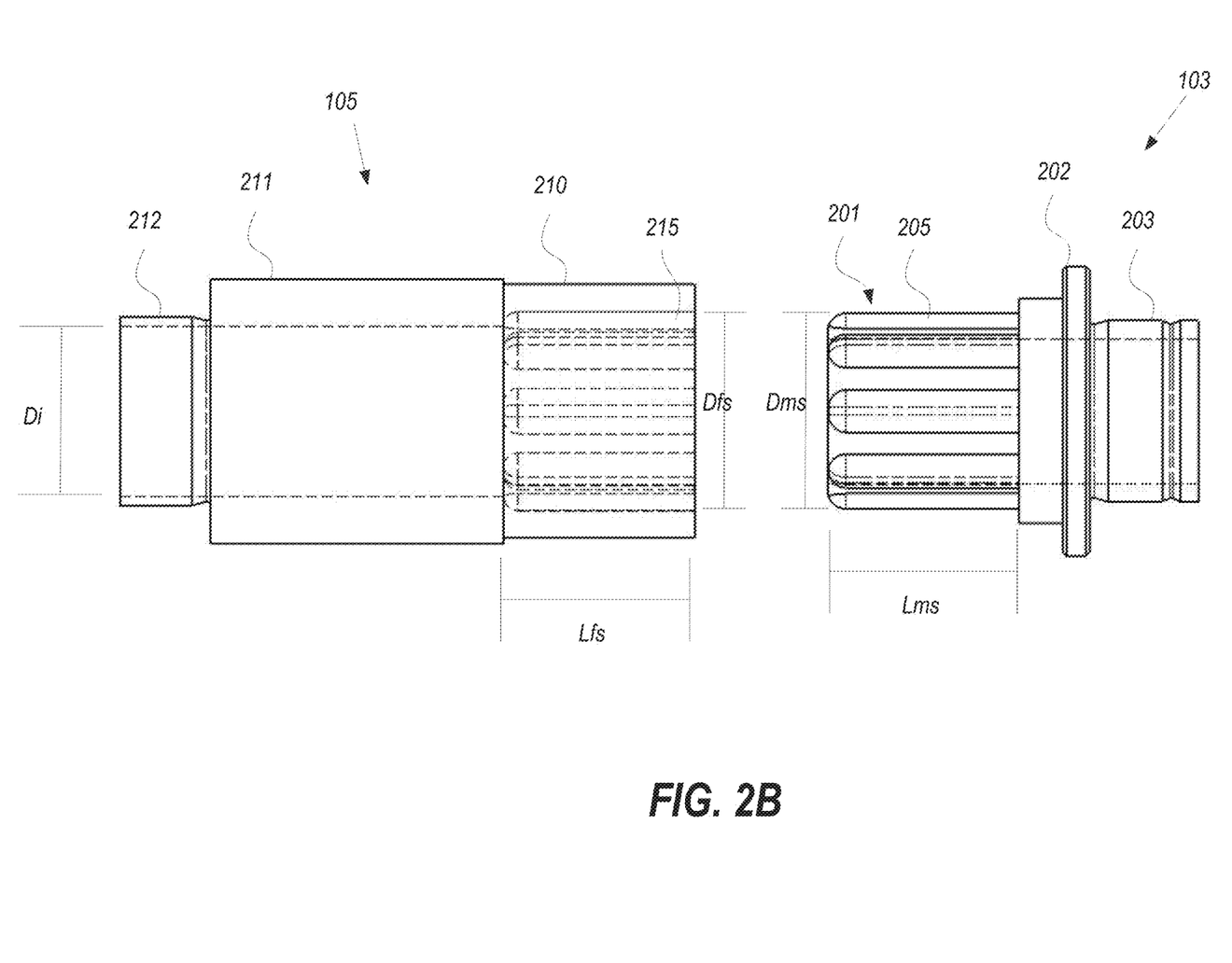
FIG. 2B an elevation view of the female helical gear and the male helical gear of the walk-in mechanism in FIG. 1 according to an aspect of present disclosure.

Referring to FIG. 2B, the length Lfs of the internal splines 215 and the length Lms of the external splines 205 are significantly equal. The smallest internal diameter Di of the female helical gear 105 is relatively greater than the external diameter (addendum circle) of the lead screw 101 (shown in FIG. 1). For instance the internal diameter (addendum circle) Dfs of the internal splines 215 is relatively greater than the external diameter (addendum circle) of the lead screw 101 (shown in FIG. 1). Further the diameter of the base circle of the internal splines 215 and the diameter of the base circle of the external splines 205 are significantly the same.

Figure 2C:
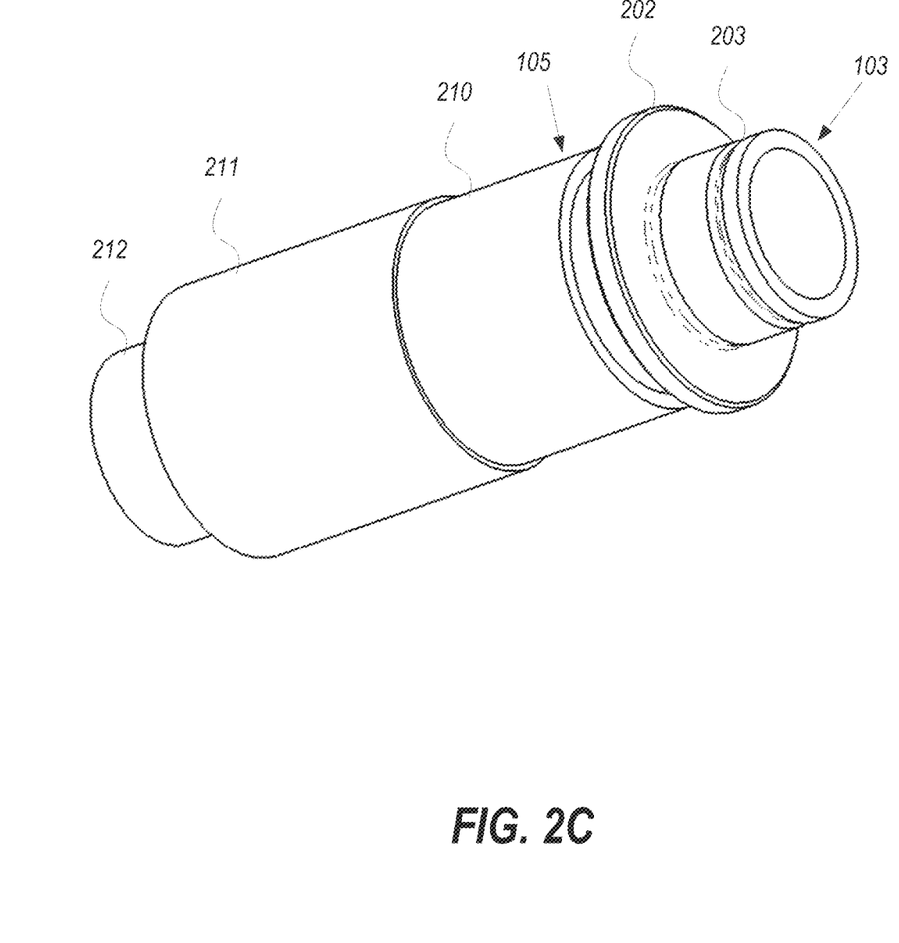
FIG. 2C a perspective view of the assembly of the female helical gear and the male helical gear of the walk-in mechanism in FIG. 1 according to an aspect of present disclosure.
Figure 2D:
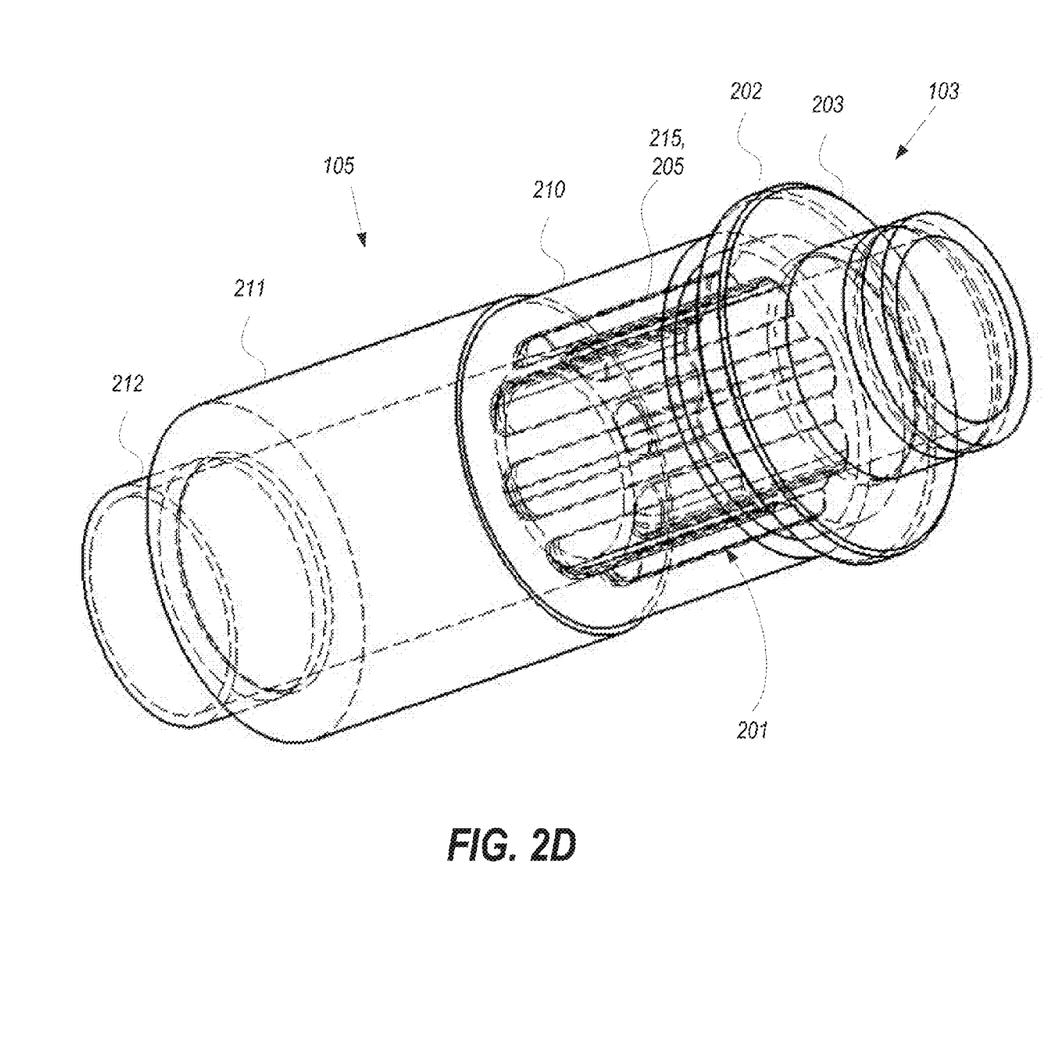
FIG. 2D a perspective view of the assembly of the female helical gear and the male helical gear of the walk-in mechanism in FIG. 1 showing internal details according to an aspect of present disclosure.

FIGS. 2C and 2D illustrate a perspective view of the assembly of the male helical gear 103 and the female helical gear 105. The first step 201 (in FIG. 2D) of the male helical gear 103 is inserted inside the first step 210 (in FIG. 2D) of the female helical gear 103.

Figure 3:
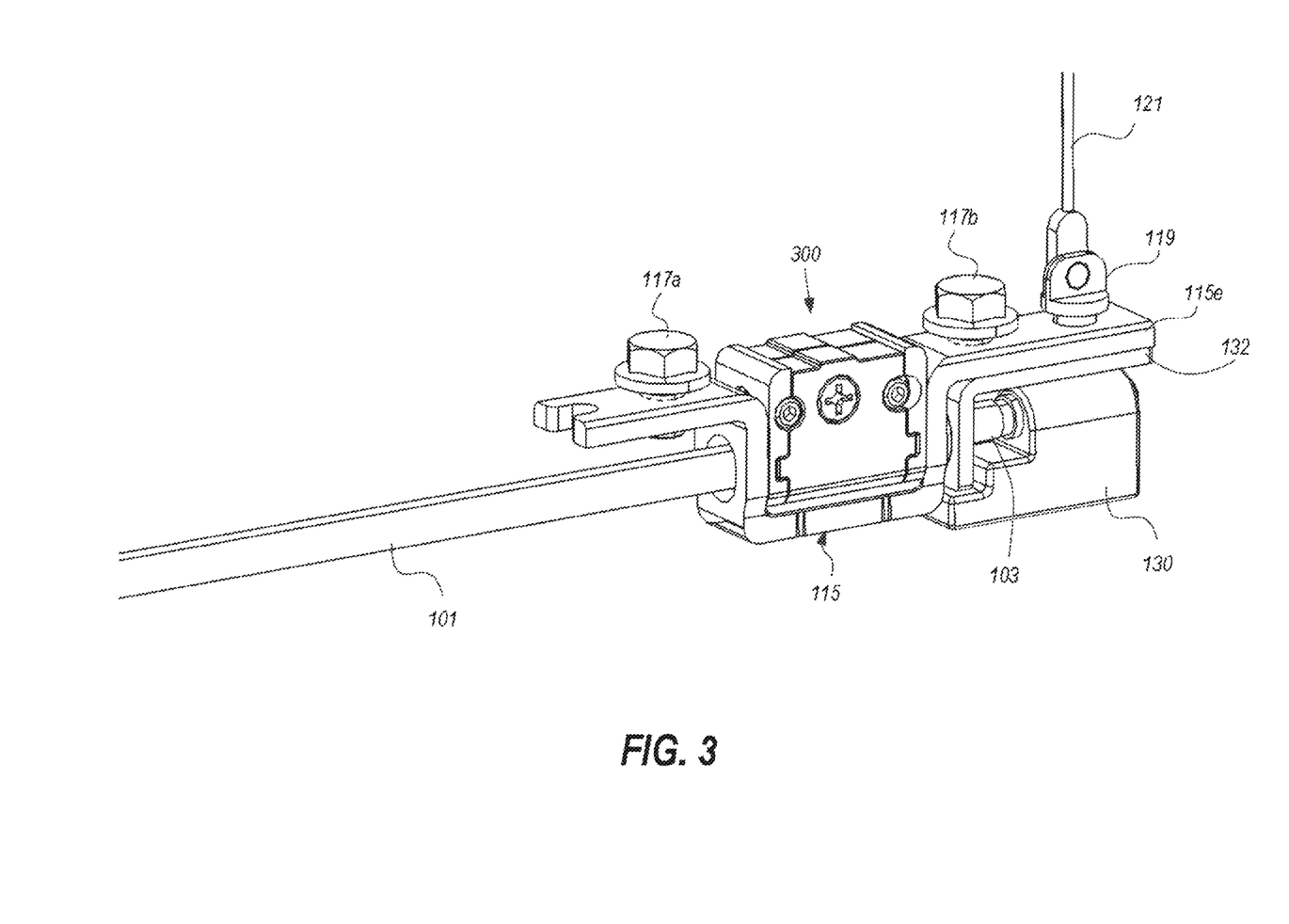
FIG. 3 is a perspective view of the walk-in mechanism when in locked state according to an aspect of present disclosure.
Figure 7:
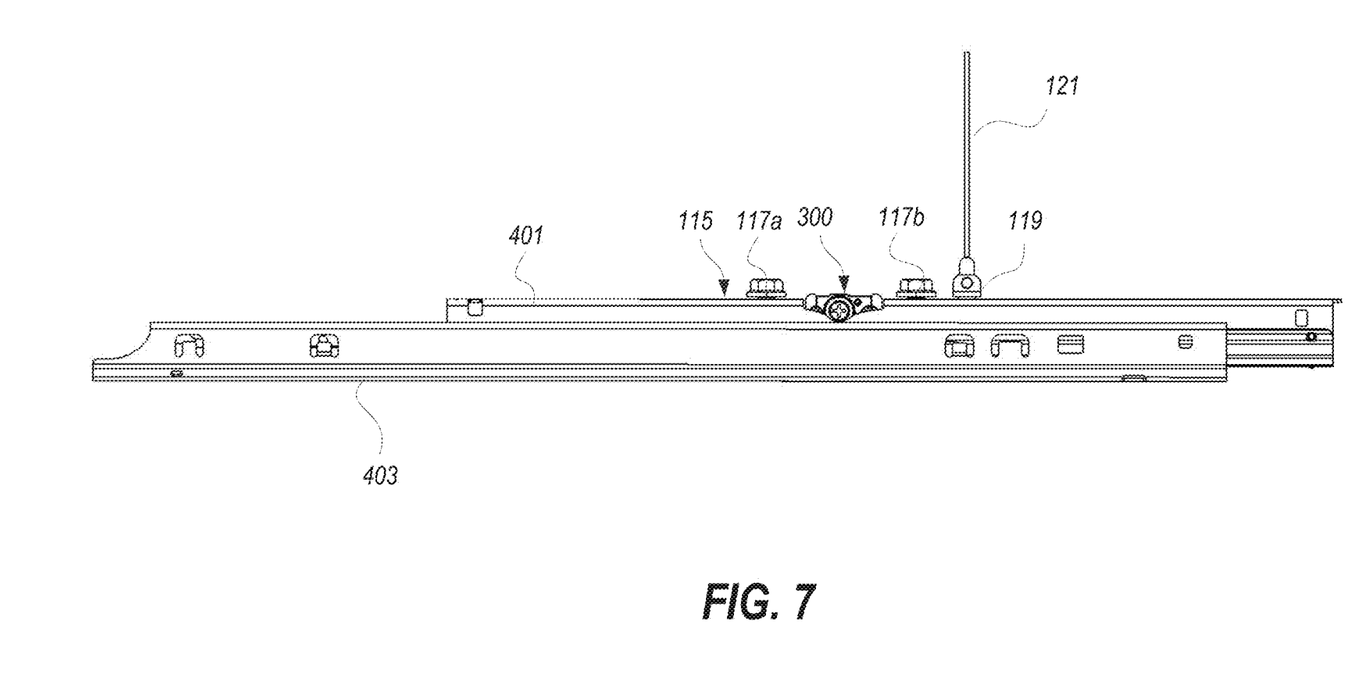
FIG. 7 is an elevation view of the walk-in mechanism mounted within an upper rail and a lower rail according to an aspect of present disclosure.

FIG. 3 is a perspective view of the walk-in mechanism 100 when in locked state. In the locked state configuration, the hat bracket 115 is connected to fixed bracket 132 via locking pin 119 and positioned in towards the lead support 130. The female helical gear 105 (not visible) within the housing 300 is connected to the male helical gear 103, which is attached to the lead screw 101. The flange 115e is located above the fixed bracket 132. The hat lock hole 119a is aligned with the lock hole 133 of the fixed bracket 132. The locking pin 119 is inserted though the lock holes 119a and 133 which keeps the hat bracket 115 and the fixed bracket 132 attached together. The walk-in mechanism 100 and the lead screw 101 are placed within the upper rail 401 and the lower rail 403, as illustrated in FIG. 7.

Figure 4:
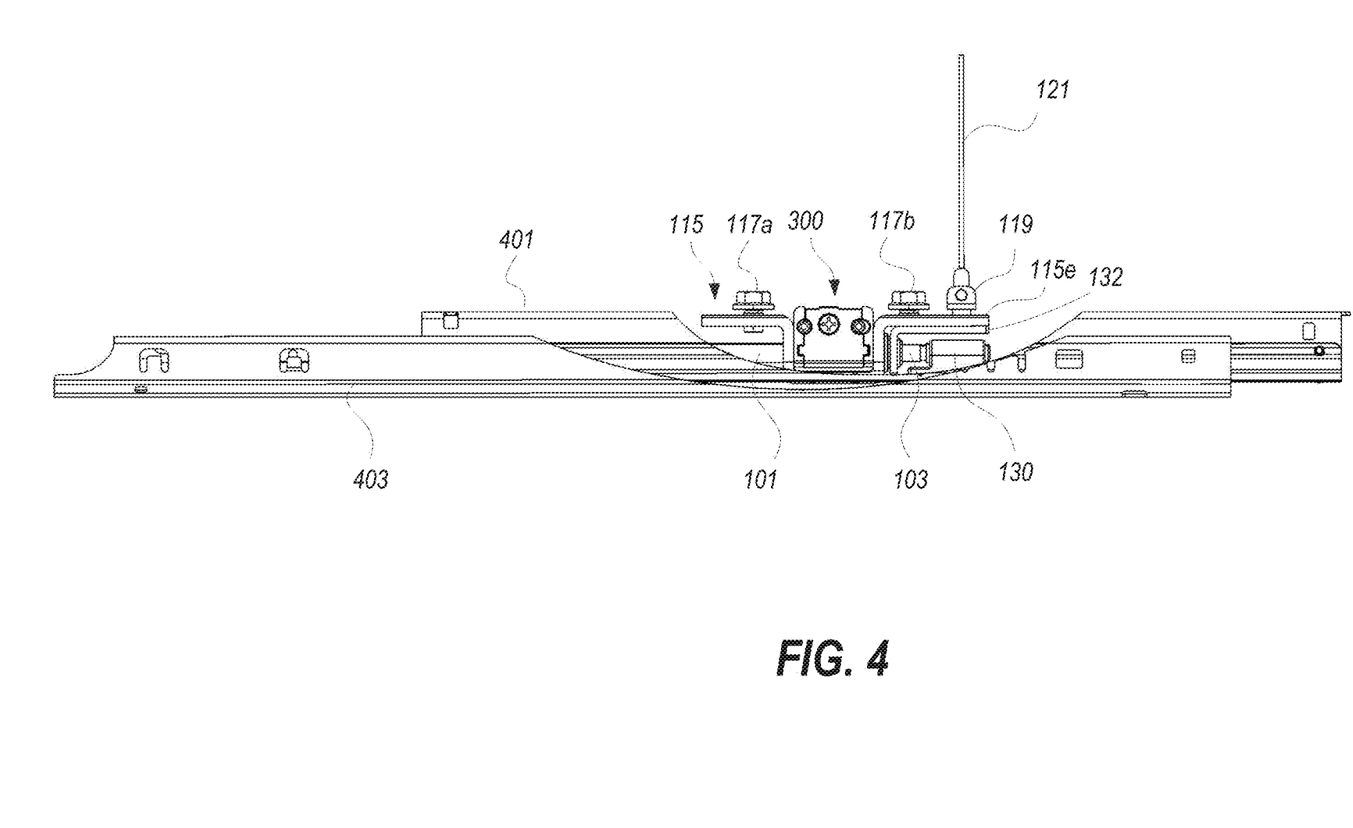
FIG. 4 is an elevation view of the walk-in mechanism when in locked state and mounted within an upper rail and a lower rail according to an aspect of present disclosure.

In FIG. 4, the upper rail 401 (shown as cut section) is attached to the flange 115d and 115e of the hat bracket 115 via the rail fasteners 117a and 117b. The lower rail 403 is attached to the lead support 130. In the locked state, the upper rail 401 connected to the lower rail 403 via the lead screw 101. The upper rail 401 moves relative to the lower rail 403 in the forward or backward direction depending on the rotation of the motor helical gear 107. When the motor helical gear 107 is rotated in counter-clockwise direction by a motor (not shown), the motion is transmitted to the connected female helical gear 105 (not visible) within the housing 300. The rotation of the female helical gear 105 is further converted into rotation of the male helical gear 103 which is engaged with the helical gears of the lead screw 101. Therefore, a torque transferred between the internal splines 215 of the female helical gear 105 and the external splines 205 of the male helical gear 103 when connected together moves the upper rail 401 relative to the lower rail 403. The speed at which the upper rail 401 moves relative to the lower rail 403 is determined by the rotation speed of the motor helical gear 107, the gear ratio of the female helical gear 105 and the pitch of the lead screw 101.

Figure 5:
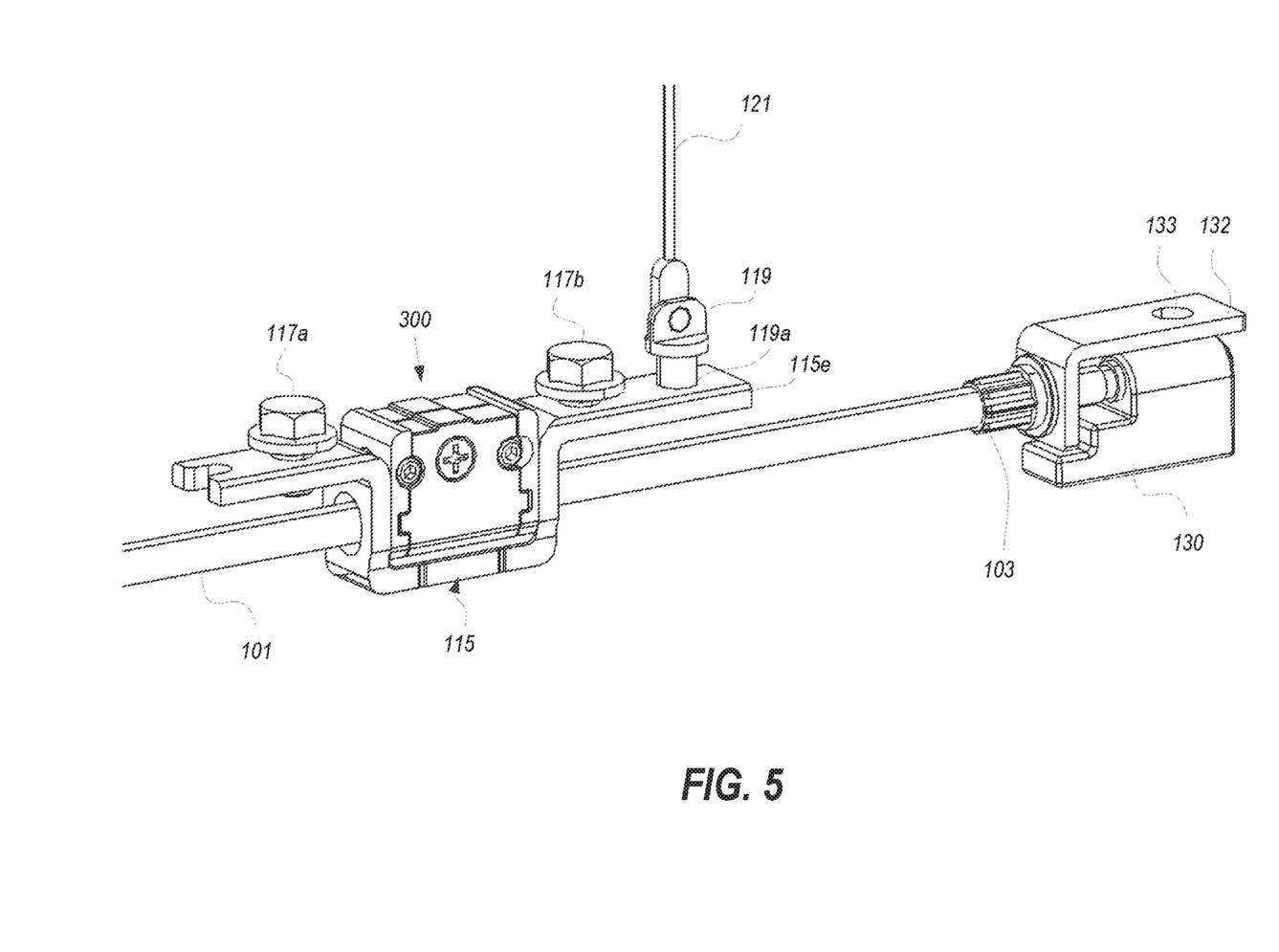
FIG. 5 is a perspective view of the walk-in mechanism 100 in unlocked state according to an aspect of present disclosure.

FIG. 5 is a perspective view of the walk-in mechanism 100 in unlocked state. The unlocked state is achieved when the locking pin 119 is pulled out of the lock hole 133 on the fixed bracket 132. In the unlocked state configuration, the hat bracket 115 is positioned away from the lead support 130 while exposing the male helical gear 103. The female helical gear 105 (not visible) within the housing 300 is completely disconnected from the male helical gear 103, which remains attached to the lead screw 101. The hat lock hole 119a is not aligned with the lock hole 133 of the fixed bracket 132. The locking pin 119 stays inserted though the lock hole 119a. As the female helical gear 103 is disconnected from the male helical gear 103 and the hat bracket 115 is disconnected from the fixed bracket 132, the upper rail 401 (shown in FIG. 6) and lower rail 403 (shown in FIG. 6) gets disconnected.

Figure 6:
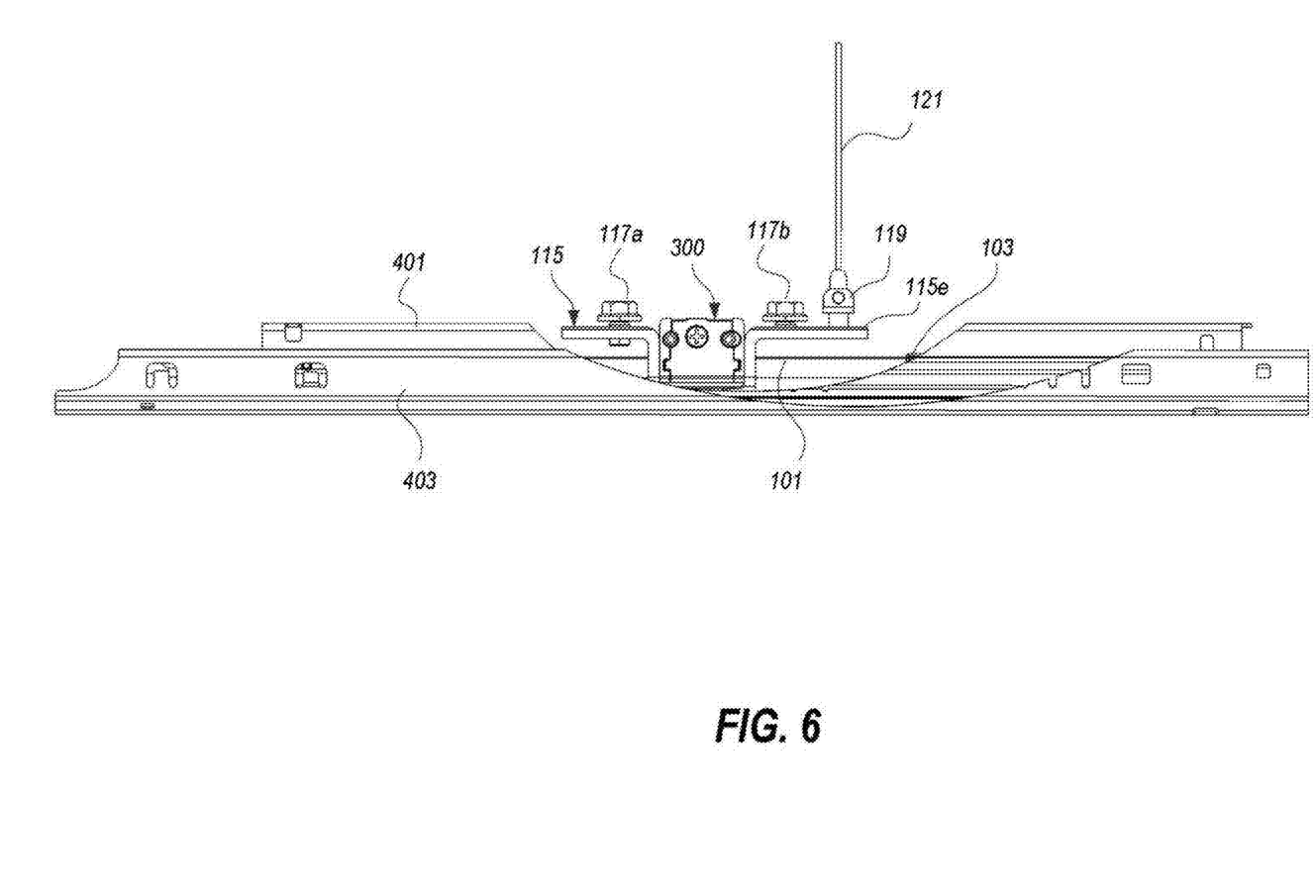
FIG. 6 is an elevation view of the walk-in mechanism when in unlocked state and mounted within an upper rail and a lower rail according to an aspect of present disclosure.

FIG. 6 illustrate Walk-in mechanism 100 installed within the rails and is in the unlocked state configuration. In the unlocked state configuration the upper rail 401 moves forwards and the upper rail 401 can move freely with respect to the lower rail 403. In the unlocked state, the female helical gear 105 is completely disconnected from the male helical gear 103 by separating, the internal splines 215 from the external splines 205. As such, even if the motor helical gear 107 is rotated by the motor (not shown), the motion will not be transmitted to male helical gear 103 attached to the lead screw 101.

Also, it should be understood that this technology when embodied is not limited to the above-described embodiments and that various modifications, variations and alternatives may be made of this technology so far as they are within the spirit and scope thereof.

What is claimed is:

1. A walk-in apparatus for a seat of a vehicle, the seat including an upper rail and a lower rail connected to a floor of the vehicle, the apparatus comprising:
    a lead screw configured to be connected to the lower rail;
    a male helical gear coaxially threaded to the lead screw, the male helical gear including external splines;
    a female helical gear configured to be connected to the upper rail, the female helical gear including internal splines configured to engage with the external splines of the male helical gear, wherein the male helical gear and the female helical gear are selectively separable, and wherein a torque transferred between the internal splines of the female helical gear and the external splines of the male helical gear when connected moves the upper rail relative to the lower rail.

2. A walk-in apparatus for a seat of a vehicle, the seat including an upper rail and a lower rail connected to a floor of the vehicle, the apparatus comprising:

a lead screw configured to be connected to the lower rail;

a male helical gear connected to the lead screw, the male helical gear including external splines;

a female helical gear configured to be connected to the upper rail, the female helical gear including internal splines configured to engage with the external splines of the male helical gear;

a fixed bracket including a first lock hole and a gear hole that supports the male helical gear;

a hat bracket including a flange, the flange including a second lock hole; and a locking pin that passes through the second lock hole of the hat bracket and the first lock hole of the fixed bracket when the first lock hole is aligned with the second lock hole, wherein the male helical gear and the female helical gear are selectively separable, and wherein a torque transferred between the internal splines of the female helical gear and the external splines of the male helical gear when connected moves the upper rail relative to the lower rail.

3. The walk-in apparatus for the seat according to claim 2, further comprising:

a motor helical gear configured to mesh with the female helical gear, wherein a rotation axis of the motor helical gear is substantially perpendicular to a rotation axis of the female helical gear.

4. The walk-in apparatus for the seat according to claim 3, further comprising:

a housing that contains the female helical gear and the motor helical gear, the housing being held by the hat bracket.

5. The walk-in apparatus for the seat according to claim 1, wherein the female helical is coaxial to the lead screw and able to move relative to the lead screw.

6. The walk-in apparatus for the seat according to claim 5, wherein the female helical gear has an internal diameter greater than an external diameter of the lead screw.

7. The walk-in apparatus for the seat according to claim 1, wherein the internal splines and the external splines are aligned with the lead screw.

8. The walk-in apparatus for the seat according to claim 1, wherein the female helical gear is coaxial to the lead screw and has no direct contact with the lead screw.

* * * * *